May 16, 1950      A. J. SINGER      2,508,197
METHOD OF PREPARING PHARMACEUTICAL PACKAGES
Filed Jan. 15, 1947
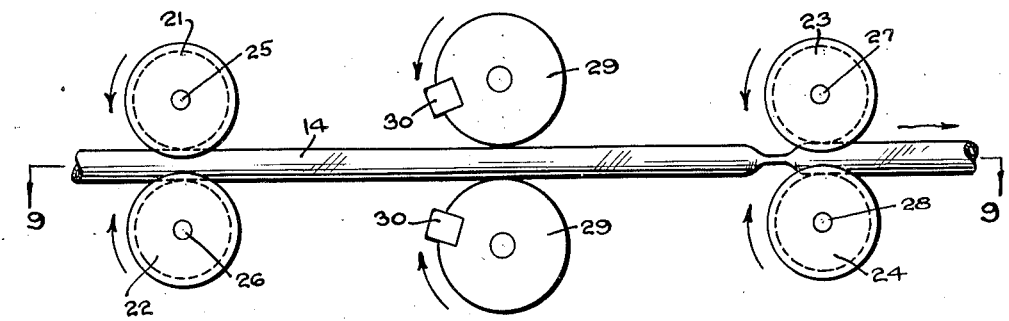
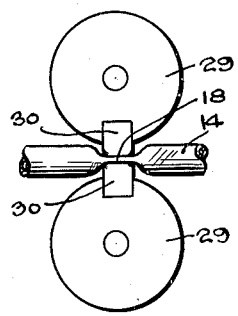
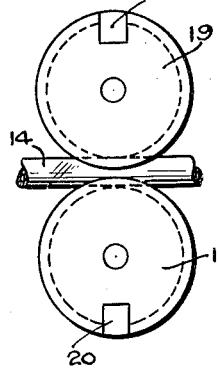
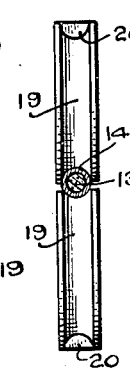
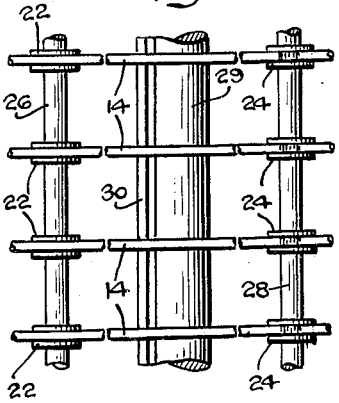
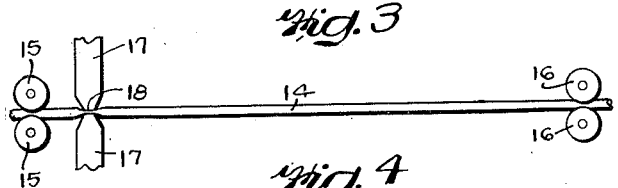
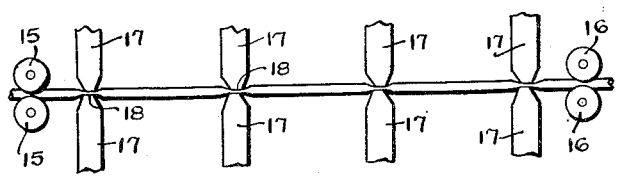
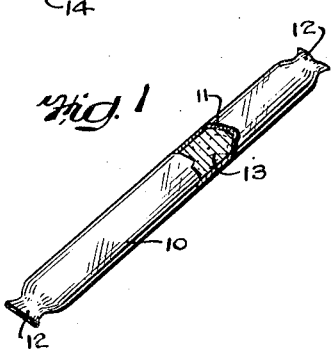
INVENTOR.
ARNOLD J. SINGER
BY
*Leon Edelson*
ATTORNEY Patented May 16, 1950

2,508,197

UNITED STATES PATENT OFFICE 2,508,197

METHOD OF PREPARING PHARMACEUTICAL PACKAGES

Arnold J. Singer, Newark, N. J., assignor to Chatham Pharmaceuticals, Inc., Newark, N. J., a corporation of New Jersey Application January 15, 1947, Serial No. 722,270

3 Claims. (Cl. 93—3)

This invention relates generally to the packaging of various materials and more particularly to the production of hermetically sealed packages the interiors of which are filled with the material in the course of producing the package, the present invention residing not only in the package per se as an article of manufacture but also in the method of producing the same.

Among the principal objects of the present invention is to provide an hermetically sealed package of material generally in the form of a plastic tube, the opposite ends of which are flattened and sealed upon the application of suitable pressure and heat thereto, the package so formed being characterized in that either or both of its flattened ends may be readily cut off to open the tubular package for dispersing of the material therefrom. Or, if so desired, the package may be employed as a form of ampoule in which case the contained material may be withdrawn therefrom by means of a hypodermic needle inserted into the plastic wall of the sealed package.

A further object of the invention is to provide a simple, effective and inexpensive method of producing in quantity hermetically sealed packages filled with material as aforesaid. Thus, in accordance with the principles of the present invention, a suitable length of plastic tubing is initially filled with any desired material to be subsequently dispensed, the tubing so filled with such material being then collapsed at spaced points in its length under heat and pressure sufficient to cause the collapsed walls thereof to become fused or sealed together to provide a plurality of individually sealed tubular units linked together by flattened portions and adapted to be separated from one another by the simple expedient of severing the intervening flattened portions of the tubing.

While the present invention may be well employed for providing hermetically sealed packages of any desired material of a form adapted to be received within the bore of a relatively long length of plastic tubing, it is particularly applicable to the packaging of liquid preparations, such as pharmaceuticals, including injectibles. However, as will be apparent hereinafter, the present invention is not limited to such specific application, but instead may be employed for the packaging of various materials in either liquid, powdered, pellet, or paste form.

The material of which the tubular envelop of the package is formed may be any of a large variety of thermo-plastic materials now commercially available, as for example, polythene, polyethylene, and the vinyl resins, including the copolymers of vinyl chloride and acetate. Acrylics, styrenes and other such thermo-plastics may also be employed, it being preferred, however, that the plastic of which the tubing is formed be sufficiently transparent so as to reveal the contents of each hermetically sealed unit produced of the tubing. It is also essential that the tubing be formed of a thermo-plastic material which is so fusable when subjected to heat that upon application of pressure to the tubing sufficient to flatten the wall thereof the flattened portions in contact with each other become integrally bonded to provide an hermetic seal at the point of application of such heat and pressure. Of course, the temperature and pressure may vary depending upon the wall thickness and diameter of the tubing employed for production of the individually sealed packaged units of the present invention, but generally speaking it is preferred that the tubing be formed of a thermo-plastic material which is fusable within a temperature range of from 100° C. to 150° C.

It will be understood from the foregoing that the present invention consists generally in the combination, arrangement, location and relative arrangement of parts entering into the construction of the packaged units aforesaid, as well as into the method of producing the same, as will appear more fully hereinafter, as shown in the accompanying drawings and as finally pointed out in the appended claims.

In the accompanying drawings, which are illustrative of the principles of the present invention and which show preferred embodiments thereof:

Figure 1 is a perspective view showing a packaged unit as constructed in accordance with the present invention;

Figure 2 is a longitudinal sectional view of a length of tubing filled with material and collapsed at spaced points in its length to provide a plurality of linked, individually sealed units;

Figure 3 illustrates, more or less diagrammatically, an apparatus for and method of applying heat and pressure to the material-filled tubing to form the linked assembly of units shown in Figure 2;

Figure 4 illustrates a modified form of apparatus wherein a gang of heat-and-pressure-applying members are employed for producing simultaneously a plurality of sealed units in a given length of the tubing;

Figures 5 and 6 are side and end views, respectively, of a cooperating pair of roller-type members for applying heat and pressure to the tubing at uniformly spaced intervals in its length; and Figures 7, 8 and 9 are views showing a form of apparatus employing roller-type members adapted to apply heat and pressure simultaneously to a plurality of laterally spaced lengths of tubing at uniformly spaced intervals in the lengths thereof.

Referring now to the drawings and more particularly to Figure 1, it will be observed that the unit package 10 of the present invention consists essentially of a thin-walled tubular body portion 11 the opposite extremities 12—12 of which are flattened to provide hermetically sealed ends for said body portion, the interior of which is filled with any desired material 13 as aforesaid. The internal dimensions of the tubular unit determine, of course, the quantity of the material contained therein, and, thus, when such units are of uniform diameter and length they will contain uniformly equal quantities of material. In order to dispense the material 13 from its sealed container, it is merely necessary to cut off one or both flattened ends 11—11 thereof whereupon the contents may be readily emptied for use. Or, if the unit package is filled with a pharmaceutical intended for hypodermic application, the contents of the package may be withdrawn by means of the hypodermic needle inserted into and through the tubular wall of the sealed unit, the body portion 11 of which, as hereinbefore described, is formed of a plastic material which readily lends itself to be pierced by a hypodermic needle.

For the quantity production of the unit packages 10 of the present invention, a length of tubing 14 formed of a suitable thermo-plastic material as aforesaid is initially filled with the desired material to be packaged. The filling of such tubing may be performed by any suitable means and method, but where the internal bore of the tubing is small, it may be desirable to draw the material into one end of the tubing by means of suction applied to its opposite end. The tubing 14, when so filled with material, may be of any desired length convenient to be handled in the packaging plant and such length of filled tubing 14 is then fed between longitudinally spaced pairs of feed rollers 15—15 and 16—16, as illustrated in Figure 3. In this latter arrangement of the tube-feeding apparatus, a pair of suitably heated pressure-applying members 17—17 are respectively disposed at diametrically opposed sides of the tubing, any suitable means being provided for so operating these pressure members in timed relation to the feed of the tubing through the feed rollers 15—15 and 16—16 as to collapse the tube wall at uniformly spaced intervals in the length of the tubing. Preferably, the operation of the apparatus as illustrated in Figure 3 is such that automatically as a predetermined length of tubing is fed through the feed rollers further feed is interrupted for an interval of time sufficient to permit the heated pressure members 17—17 to flatten the tubing, as at 18, the feed of the tubing being resumed upon retraction of the pressure members from their contact with the tubing. By proper operational timing of the feed rolls and pressure members, the feed of the tubing is intermittently interrupted at spaced time intervals and for such time duration as to enable the pressure members 17—17 to apply heat and pressure to the tube sufficient to cause the flattened portions 18 thereof to be integrally bonded together. There is thus produced in the length of tubing, a series of individually sealed unit packages 10 (see Figure 2) linked together by the intermediate flattened portions 18, the several unit packages being adapted for separation one from the other by the simple expedient of severing each flattened portion substantially midway of its length. If desired, this separation of the tubing into separate unit packages may be performed automatically by suitable cutting elements (not shown) which may be included in the apparatus for operation in suitable timed relation with the operation of the feed rollers and pressure members.

In the arrangement of apparatus illustrated in Figure 4 a gang of the pressure members 17—17, arranged in pairs spaced longitudinally along the length of the tubing 14, is employed, the several pairs of pressure members being operative simultaneously upon the tubing to simultaneously produce a series of hermetically sealed flattened portions 18 and consequently a plurality of the individually sealed units in a given length of the tubing fed through the feed rollers. By varying the longitudinal spacing between coacting pairs of the pressure members, unit packages of different lengths may be produced, the length of each being, of course, determined by the spacing between adjacent pairs of the pressure members. Thus, for each length of tubing intermittently fed through the feed rollers of the apparatus, a group of unit packages may be simultaneously produced each of which may contain a different quantity of material, the contained quantity being determined by the length of the hermetically sealed individual package.

Figures 5 and 6 illustrate another type of device for applying heat and pressure to the tubing 14 as it is continuously fed through its feed rolls, such as 15—15 and 16—16 of the form of apparatus shown in Figure 3. Thus, instead of embodying a pair of coaxial pressure members, such as 17—17 of Figure 3, there may be employed a pair of flanged roller-type pressure members 19—19 each of which includes in its peripheral rim a suitably heated pressure element 20. The members 19—19 are relatively so arranged that as the tubing is fed therethrough the pressure elements 20 thereof simultaneously engage opposite sides of the tubing once for each revolution of the rollers 19—19 to flatten and seal the tubing at spaced intervals in its length, the spacing between the flattened portions 18 (see Figure 2) being equal to the circumference of the tube-engaging rim of each roller 19. If desired, the apparatus employing the roller-type pressure-applying members 19—19 of Figures 5 and 6 may be so operated as to intermittently interrupt rotation of the members upon contact of their heated elements 20—20 with the tubing, the dwell being of sufficient duration to insure integral bonding of the tubing walls in the zone of each flattened portion 18 thereof. By employing roller-type pressure members of the type just described, and feeding a length of filled tubing therethrough, the sealed portions 18 are uniformly spaced apart and there is thus assured the production of individual hermetically sealed package units of uniform length containing therein uniformly equal quantities of the material of which the tubing was initially filled. It will thus be apparent that by varying the diameter of the roller-type pressure members 19—19, the lengths of the sealed units may be fixed to provide each unit with a predetermined quantity of contained material.

Figures 7, 8 and 9 illustrate still another arrangement of apparatus wherein a plurality of lengths of filled tubing 14 may be operated upon simultaneously. Thus, in this form of apparatus, two pairs of cooperating feed rolls 21—22 and 23—24 are provided for each length of the tubing 14, the corresponding rolls of each pair being fixed upon a common shaft extending transversely across the several lengths of the tubing. Thus, the rolls 21 are all keyed to a common shaft 25, the rolls 22 to a common shaft 26, the rolls 23 to a common shaft 27 and the rolls 24 to a common shaft 28. Disposed intermediately of the two pairs of feed rolls just described is a pair of pressure rolls 29—29, each of which extends transversely of the sseveral lengths of tubing and is fitted with a suitably heated bar 30. As the several lengths of tubing traverse the rolls 29—29, the bars 30—30 thereof cooperate to simultaneously effect flattening of each tube length under sufficient pressure and heat to seal the same at spaced intervals in its length.

The unit package produced in accordance with the present invention is applicable for use in connection with a wide variety of materials, including particularly pharmaceuticals and chemical preparations which are to be preserved against deterioration. In the case of parenteral and other solutions, where sterilization of the package containing the same may be required, the sterilization temperature itself may well be employed to effect the integral bonding of the flattened portions 18 of the tubing initially filled with the parenteral solution. Thus, for the packaging of parenteral solutions, such as are intended for hypodermic injection, it has been found that tubing formed of the vinyl resins may be sealed off at sterilization temperature. In such case, the length of tubing 14 initially filled with the desired solution may be clamped at suitably fixed intervals in its length to provide the flattened portions 18 aforesaid and then placed in an autoclave where sterilization is effected by steam under pressure. When steam at about 15 pounds pressure is employed, a temperature of about 120° C. is obtained, which when maintained for a period of about 15 minutes, is sufficient to sterilize the filled tubing and at the same time effect an hermetic seal between the flattened walls of the tubing.

It will be understood, of course, that the present invention is susceptible of various changes and modifications which may be made from time to time without departing from the general principles or real spirit of the invention and it is accordingly intended to claim the same broadly, as well as specifically, as indicated in the appended claims.

What is claimed as new and useful is:

1. A method of producing sterile ampoules containing dosage quantities of a pharmaceutical or like preparation which consists in filling a length of thermoplastic tubing with said preparation, in then flattening the wall of said tubing at uniformly spaced points in the length thereof by the application of pressure against diametrically opposed sides of said tube at each of said points, and in then subjecting said filled tubing to a sterilizing temperature while maintaining said wall-flattening pressures on said tubing, said sterilizing temperature being sufficiently high to cause the pressure flattened portions of the thermoplastic tubing to become integrally bonded whereby to hermetically seal separate quantities of the preparation aforesaid in spaced lengths of the tubing.

2. In a method as defined in claim 1 wherein the pressure-flattened portions are spaced equally lengthwise of the tubing to provide a plurality of hermetically sealed equal-length tubular sections respectively containing equal quantities of said preparation.

3. In a method as defined in claim 1 wherein said spaced lengths of the tubing are separated by severance of the integrally bonded flattened portions to provide each spaced length with hermetically sealed flattened ends.

ARNOLD J. SINGER.

REFERENCES CITED

The following references are of record in the file of this patent:

UNITED STATES PATENTS

| Number | Name | Date |
|---|---|---|
| 700,805 | Paine | May 27, 1902 |
| 1,637,153 | Lawton | July 26, 1927 |
| 2,430,995 | Roos | Nov. 18, 1947 |